UNITED STATES PATENT OFFICE.

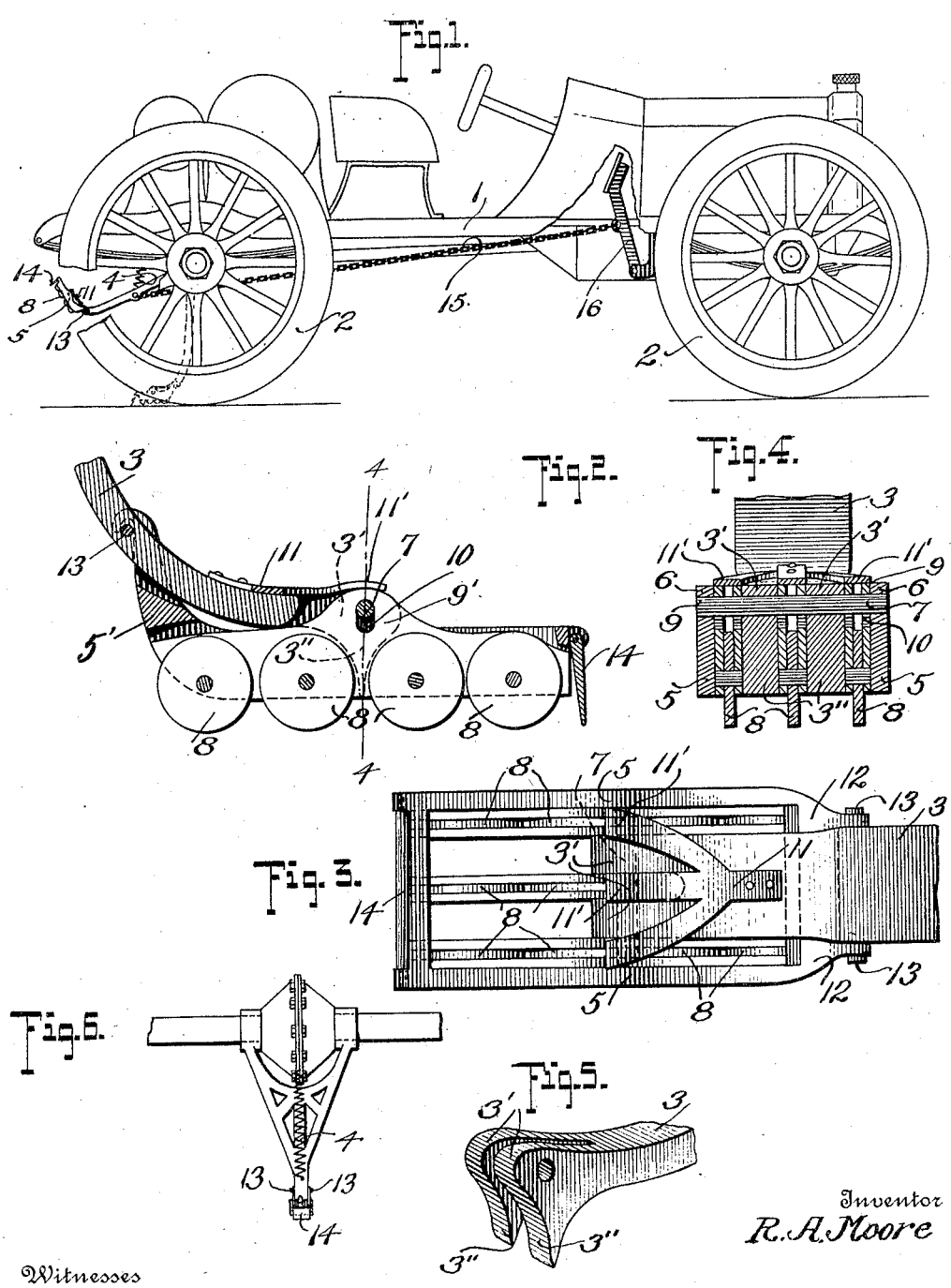

ROBERT A. MOORE, OF NEW YORK, N. Y., ASSIGNOR TO THE MOORE AUTO SKID PREVENTER COMPANY, OF NEW YORK, N. Y., A CORPORATION OF NEW YORK.

AUTOMOBILE ANTISKIDDING DEVICE.

1,053,200.  Specification of Letters Patent.  Patented Feb. 18, 1913.

Application filed September 26, 1911. Serial No. 651,455.

*To all whom it may concern:*

Be it known that I, ROBERT A. MOORE, a citizen of the United States, residing at New York, in the county of New York and State of New York, have invented certain new and useful Improvements in Automobile Antiskidding Devices, of which the following is a specification.

The present invention embodies certain improvements in that type of skid preventing means for automobiles, and like vehicles, described in my application for patent, Serial Number 593,100, filed November 18, 1910.

While in my application above mentioned, the skid preventing device set forth is adapted to accommodate to a certain extent for inequalities in the surface against which it operates, said device is liable to be rendered ineffective because, when one of the tread elements comprising the same strikes an obstacle, or inequality in the surface of the ground, the other elements are liable to be raised from the surface and rendered inoperative.

My object in devising the present improvements has been primarily to increase the efficiency of the above invention in relation particularly to the operation of the tread elements, the latter being now peculiarly mounted so as to move bodily with a supporting frame, in addition to which movement they are susceptible of simultaneous rocking and bodily movement on the supporting frame, as well as independent rocking and bodily movement.

The above arrangement and construction of parts permits practically all of the tread elements to operate upon a surface irrespective of the engagement of one or more of said elements with inequalities disposed either laterally or forwardly of the device.

With the above and other objects in view, this invention consists in the construction, combination, and arrangement of parts, all as hereinafter more fully described, claimed and illustrated in the accompanying drawings, wherein—

Figure 1 is a side elevation showing the frame of a motor vehicle and illustrating the invention applied thereto; Fig. 2 is a longitudinal sectional view of the skid preventing device; Fig. 3 is a top plan view of the same; Fig. 4 is a section taken about on the line 4—4 of Fig. 2: Fig. 5 is a detail view of the pivoted standard which supports the skid preventing device; and Fig. 6 is a rear view of the skid preventing device showing the manner of mounting the same upon the central rear portion of the vehicle.

Throughout the following detail description and on the several figures of the drawings, similar parts are referred to by like reference characters.

In the drawings, 1 denotes the frame or chassis of an ordinary motor vehicle of any conventional type and 2 the wheels of the same.

The skid preventing device hereinafter more fully described is preferably supported at the rear end of the vehicle by a standard 3 which is hung in a pivotal manner from the rear axle of said vehicle. It is preferred that the standard 3 shall be connected with the vehicle at a point longitudinally central thereof in order not to disturb the equilibrium of the machine in traveling when the skid preventing means is thrown into operative relation to the ground. The exact manner of attachment of the standard 3 to the vehicle is immaterial, but coöperating with said standard is a resilient device 4 normally tending to hold the standard in such a position that the tread device supported by the lower end thereof is elevated from the ground. The tread device above mentioned constitutes the earth engaging means by which the skidding of the vehicle is prevented, and said device comprises essentially a frame 5 of somewhat rectangular form, the opposite sides of the frame having upwardly projecting ears 6 provided with openings through which a pivot 7 passes, said pivot also extending through the bifurcated lower portion 3' of the standard 3.

Peculiarly mounted in the frame 5 are a plurality of tread elements 8 preferably in the form of rollers. While any suitable number of rollers 8 may be utilized, it is contemplated to employ three sets of these rollers, each set being mounted between a pair of plates 9. As shown, three pairs of the plates 9 are employed, and said plates are formed at their central portions with lugs 9' corresponding somewhat in shape to the ears 6 at opposite sides of the frame 5. Slots 10 are formed in the lugs 9' and permit vertical bodily movement of the members 9 with the rollers 8 supported thereon. Secured to the lower end portion of the standard 3, however, is a spring 11 having its free end portion formed with a plurality of spring members 11', which members engage with the lugs 9' and bear downwardly upon the plates 9 sufficiently to yieldingly maintain the plates with the rollers 8 at the lower limit of movement prescribed by the length of the slots 10. It will be apparent, however, that by reason of the independent mounting of the sets of rotary tread elements 8, each set is adapted to yield upwardly independently of the adjacent set or sets. This yieldability of the rollers 8 is an important advantage derived from the use of the present invention in that as the vehicle passes over a surface having lateral inequalities, the various tread rollers 8 will yield so as to cause all of the rollers to remain in operative contact with the surface upon which they may be depressed.

In order to hold the sets of plates 9 in proper spaced relation and to increase the substantiality of the connection between the standard 3 and the frame 5 of the tread device, the bifurcate portions 3' of the standard 3 are formed with downwardly projecting extensions 3''. The extensions 3'' are arranged on opposite sides of the intermediate set of plates 9 in the spaces between the said plates and the outer sets of plates.

The construction of the parts of the tread device, whereby operation of the invention upon surfaces having lateral inequalities having been described, it will be noted that the pivotal mounting afforded by the connection between the sides of the frame 5 and the standard 3, permits the frame 5 to tilt bodily with the pivot 7 as its axis, thus accommodating for proper operative contact of the device with the ground, even though the latter has inequalities of surface in advance of the skid preventing means. The forward and rearward tilting of the frame 5 upon the pivot 7 is limited by means of hooks 12 which extend forwardly and upwardly from the frame 5 and engage over lugs 13 projecting from opposite sides of the standard 3. The hooks 12 limit the downward movement of the front end of the frame 5 with respect to the standard 3 and the front transverse end portion 5' of said frame, which is arranged just beneath the standard 3 limits the upward movement of said end of the frame. Since the rollers 8 are supported by the plates 9 which virtually hang from the pivot 7, it is obvious that in addition to vertically yielding bodily movement thereof, the members 8 are supported so that each set thereof may rock on said pivot. The several sets of rollers 8 therefore constitute independent tread members adapted for a rocking movement upon the standard.

At its rear end the frame 5 carries a dog 14 pivotally connected at its upper end with the frame and adapted to ride over the surface against which the skid preventing device is pressed. Said dog 14, however, is of sufficient length that, should the skid preventing device have been operated, said dog 14 will engage with the surface over which the vehicle travels and prevent rearward movement of the vehicle on release of brakes or under other conditions when the machine is liable to move rearwardly.

It is to be understood, of course, that the skid preventing device above described will be normally inoperative and any suitable means such as a chain 15 and foot lever 16 may be employed to force the device into operative contact with the ground so as to perform its function in preventing skidding of the machine such as may be readily anticipated by a driver when turning corners or under similar conditions.

Having thus fully described my invention, what is claimed as new is:—

1. The combination with a vehicle, of a swinging standard connected therewith, and a skid preventing device connected with said standard and capable of independent bodily rocking movement with relation thereto, said skid preventing device comprising a frame and independently movable tread members carried by said frame.

2. The combination with a vehicle, of a swinging standard connected therewith, a skid preventing device connected with said standard and capable of independent bodily rocking movement with relation thereto, said skid preventing device comprising a frame, sets of rollers disposed in said frame, and means permitting independent bodily movement of the sets of rollers with respect to the frame.

3. The combination with a vehicle, of a swinging standard connected therewith, a skid preventing device connected with said standard and capable of independent bodily rocking movement with relation thereto, said skid preventing device comprising a frame, a plurality of plates disposed in said frame to have restricted movement with relation thereto, and rotary members carried by said plates.

4. The combination with a vehicle, of a skid preventing device adapted to be raised and lowered with respect to the vehicle and comprising a frame, a standard connecting the frame with the vehicle, pairs of plates disposed in said frame, means permitting pivotal bodily movement and independent restricted vertical movement of said pairs of plates with relation to the frame, and a plurality of rollers mounted between each pair of plates and bodily movable with the same.

5. The combination with the frame of a vehicle, of a standard connected therewith to be moved toward and away from the ground, a frame pivoted with the standard to bodily swing with relation thereto, a plurality of longitudinal supports mounted in the frame to independently rise and fall with respect to the frame when the device is in its operative position, and a plurality of rollers carried by each of said longitudinal supports.

6. The combination with the frame of a vehicle, of a standard having its upper end pivotally connected therewith and its lower end forked for providing spacing elements, an open frame, a transverse pin passing through the lower forked end of the standard and the sides of the open frame, longitudinal spaced plates disposed in the open frame and provided with upstanding elongated slots to receive the transverse pin so that said plates can have restricted independent vertical movements with respect to the open frame, the spacing elements entering between the longitudinal plates to retain them in their requisite spaced positions, rollers connected with each longitudinal plate, and means to swing the lower end of the standard toward the ground.

7. The combination with a standard to be pivotally connected with the frame of a vehicle, of a horizontal open frame pivotally connected with the standard to swing in a vertical plane, horizontal plates disposed in the open frame to independently rise and fall with respect thereto, a plurality of rollers carried by each horizontal plate and disposed upon opposite sides of the pivot connection between the open frame and standard, and independently operating spring elements engaging the different horizontal plates.

8. The combination with a swinging standard, of an open frame provided midway of its ends with upstanding ears, a transverse pin passing through the ears and the lower end of the standard so that the open frame can bodily swing with relation to the standard, means to limit this relative swinging movement of the open frame, a plurality of pairs of horizontal plates disposed in the open frame and provided midway of their ends with vertical elongated slots to receive the transverse pin, a plurality of rollers disposed between the plates in each pair and suitably connected therewith, and a leaf spring attached to the standard and branching into several parts to engage the pairs of horizontal plates.

9. The combination with a swinging standard provided upon opposite sides with trunnions, of an open frame having hooks at one end to fit over the trunnions, and a transverse portion disposed near and below the standard to serve as a stop, means pivotally connecting the end of the standard and the intermediate portion of the open frame, a plurality of rollers disposed in the open frame, and yielding means to retain such rollers in place in said open frame.

10. The combination with an open frame, of horizontal plates disposed therein to have restricted vertical movement with relation thereto, a plurality of rollers carried by each plate, a plate pivotally connected with one end of the open frame to swing outwardly only, and suitable means to secure the open frame to a vehicle.

In testimony whereof I affix my signature in presence of two witnesses.

ROBERT A. MOORE.

Witnesses:
 CHAS. STERNHEIM,
 GREYBERT LEWIN.